United States Patent
McGuire et al.

(10) Patent No.: US 11,321,909 B2
(45) Date of Patent: May 3, 2022

(54) TRACKING AND RENDERING PHYSICAL VOLUMETRIC SUBSTANCES IN VIRTUAL REALITY

(71) Applicant: International Business Machines Corporation, Armonk, NY (US)

(72) Inventors: Michael James McGuire, Sydney (AU); Karen Hardie, Caringbah (AU); Shaila Pervin, Wolli Creek (AU); Ana Valencic, Camperdown (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/550,409

(22) Filed: Aug. 26, 2019

(65) Prior Publication Data

US 2021/0065426 A1 Mar. 4, 2021

(51) Int. Cl.
*G06T 15/08* (2011.01)
*G06T 7/62* (2017.01)
*G06T 7/00* (2017.01)

(52) U.S. Cl.
CPC ............... *G06T 15/08* (2013.01); *G06T 7/00* (2013.01); *G06T 7/62* (2017.01); *G06T 2200/08* (2013.01)

(58) Field of Classification Search
CPC .............. G06T 15/08; G06T 7/62; G06T 7/00
See application file for complete search history.

(56) References Cited

U.S. PATENT DOCUMENTS

| | | | |
|---|---|---|---|
| 6,330,281 B1 | 12/2001 | Mann et al. | |
| 2005/0219211 A1* | 10/2005 | Kotzin | G06F 1/1684 345/158 |

(Continued)

FOREIGN PATENT DOCUMENTS

| CN | 105867634 A | 8/2016 |
|---|---|---|
| CN | 107748655 A | 3/2018 |

(Continued)

OTHER PUBLICATIONS

Berg, Jenny, "There's Now a Virtual Reality Cocktail (and Yes, You Do Get a Real Drink)", Vogue, Aug. 23, 2017, 9 pages, <https://www.vogue.com/article/virtual-reality-vr-cocktail>.

(Continued)

*Primary Examiner* — Matthew Salvucci
(74) *Attorney, Agent, or Firm* — Andrew Aubert

(57) ABSTRACT

Technology for determining at least one physical property of a physical volumetric substance within a container over a time interval and rendering a virtual representation of the physical volumetric substance in a virtual reality environment. At least one physical property of the physical volumetric substance is captured by a plurality of snapshots over a time interval. The plurality of snapshots is captured by one or more components capable of identifying at least one physical property of the physical volumetric substance. The plurality of snapshots is transmitted to process, render and/or display a virtual representation of the physical volumetric substance. The virtual representation of the physical volumetric substance is based, at least in part, on the captured plurality of snapshots. An indicator data set, indicative of the one or more physical properties of a physical volumetric substance, may be transmitted to an external client.

17 Claims, 13 Drawing Sheets

(56) References Cited

U.S. PATENT DOCUMENTS

2013/0301901 A1* 11/2013 Satish .................. G06T 7/70
382/134
2016/0203365 A1* 7/2016 Breedvelt-Schouten ...................
G06T 19/006
345/633
2018/0296756 A1* 10/2018 Barth .................... A61M 5/172

FOREIGN PATENT DOCUMENTS

| | | |
|---|---|---|
| CN | 108319373 A | 7/2018 |
| KR | 100914880 B1 | 8/2009 |
| WO | 2008066954 A1 | 6/2008 |

OTHER PUBLICATIONS

Bonasio, Alice, "Drinking Up Virtual Reality", Medium, Dec. 4, 2017, 6 pages, <https://medium.com/@alicebonasio/drinking-up-virtual-reality-bde75bb1beea>.

Fourtane, Susan, "Discover the Virtual Reality Cocktail Bar: The Place For The Drinks of the Future", Interesting Engineering, Aug. 30, 2018, 8 pages, <https://interestingengineering.com/discover-the-virtual-reality-cocktail-bar-the-place-for-the-drinks-of-the-future>.

Korsgaard et al., "Immersive Eating: Evaluating the Use of Head-Mounted Displays for Mixed Reality Meal Sessions", 2017 IEEE 3rd Workshop on Everyday Virtual Reality (WEVR), Year: 2017, 4 pages.

* cited by examiner

TRACKING AND RENDERING PHYSICAL VOLUMETRIC SUBSTANCES IN VIRTUAL REALITY

BACKGROUND

The present invention relates generally to the field of computer based virtual reality simulations, and more particularly to rendering objects in a virtual environment based on corresponding objects in the physical environment around a user.

Virtual-reality (VR) is an activity that occurs within an immersive, simulated environment rendered by one, or more, computer components. VR hardware generates a realistic simulation of a user's physical presence in a virtual, computer-rendered environment. VR hardware may include devices, such as VR headsets or multi-projected environments. The rendered reality stimulates a user's senses and hardware enables the user to interact with the virtual-reality environment. VR is a growing field of technology that has numerous applications, such as VR video games and education simulations (e.g. medical training simulations).

Augmented reality (AR) is an interactive experience of a real-world environment where real-world, physical objects are enhanced by computer-generated perceptual information, sometimes across multiple sensory modalities, such as visual, auditory, haptic, somatosensory and olfactory. The overlaid sensory information may be constructive (i.e. additive to the natural environment), or destructive (i.e. masking of the natural environment). The experience is interwoven with the physical world such that the user perceives the experience as an immersive aspect of the real-world environment. Augmented reality alters a user's ongoing perception of a real-world environment. In contrast, virtual reality (VR) substitutes a user's real-world environment with a simulated one.

Three-dimensional (3-D) scanning is the process of analyzing a real-world object, or environment, to collect data on its characteristics, such as its shape and color. Accumulated data may be used to construct digital, 3-D rendered models. Accumulated 3-D model data is utilized for a variety of applications, such as importing a 3-D rendered model into a virtual reality video game. A 3-D scanner may be based on various technologies, each with its own set of limitations, advantages and costs.

Level sensors determine the level of liquids that exhibit an upper free surface. The liquid to be measured can be inside a container or in its natural form (e.g., a river or a lake). Level measurement can be either a continuous measurement, or a point values measurement. Continuous level sensors measure liquid level within a specified range and determine the precise amount of liquid in a given location. In contrast, point-level sensors indicate whether the liquid is above or below a given sensing point. Generally, point-level sensors are utilized to detect liquid levels that are excessively high or low.

SUMMARY

According to an aspect of the present invention, there is a method, computer program product and/or system that performs the following operations (not necessarily in the following order): (i) determining a plurality of snapshots of at least one physical property of a physical volumetric substance within a container over a time interval; and (ii) rendering a virtual representation of the physical volumetric substance in a Virtual Reality Environment (VRE) based, at least in part, on the determined plurality of snapshots of at least one physical property of the physical volumetric substance.

DETAILED DESCRIPTION

Figure 1:
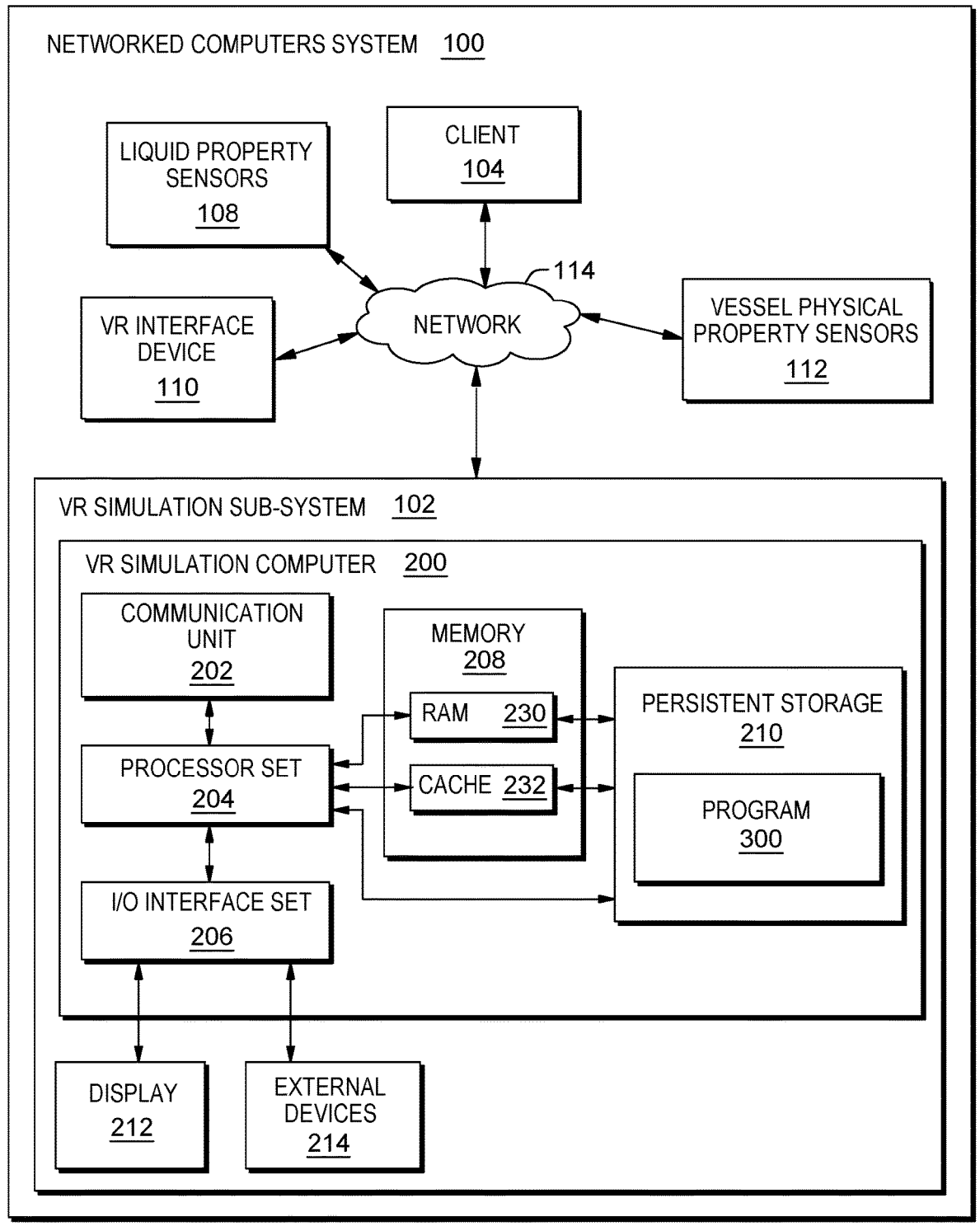
FIG. 1 is a block diagram view of a first embodiment of a system according to the present invention.

Embodiments of the present invention describe technology for determining at least one physical property of a physical volumetric substance within a container over a time interval and rendering a virtual representation of the physical volumetric substance in a virtual reality environment. At least one physical property of the physical volumetric substance is captured by a plurality of snapshots over a time interval. The plurality of snapshots is captured by one or more components capable of identifying at least one physical property of the physical volumetric substance. The plurality of snapshots is transmitted to process, render and/or display a virtual representation of the physical volumetric substance. The virtual representation of the physical volumetric substance is based, at least in part, on the captured plurality of snapshots. An indicator data set, indicative of the one or more physical properties of a physical volumetric substance, may be transmitted to external clients. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: VR simulation sub-system 102; client 104; liquid property sensors 108; VR interface device 110; vessel physical property sensors 112; communication network 114; VR simulation computer 200; communication unit 202; processor set 204; input/output (I/O) interface set 206; memory device 208; persistent storage device 210; display device 212; external device set 214; random access memory (RAM) devices 230; cache memory device 232; and program 300.

VR simulation sub-system 102 is, in many respects, representative of the various computer sub-system(s) in the present invention. Accordingly, several portions of VR simulation sub-system 102 will now be discussed in the following paragraphs.

VR simulation sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

VR simulation sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

VR simulation sub-system 102 is shown as a block diagram with many double arrows. These double arrows (no separate reference numerals) represent a communications fabric, which provides communications between various components of VR simulation sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for VR simulation sub-system 102; and/or (ii) devices external to VR simulation sub-system 102 may be able to provide memory for VR simulation sub-system 102.

Program 300 is stored in persistent storage 210 for access and/or execution by one or more of the respective computer processors set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to VR simulation sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with VR simulation computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
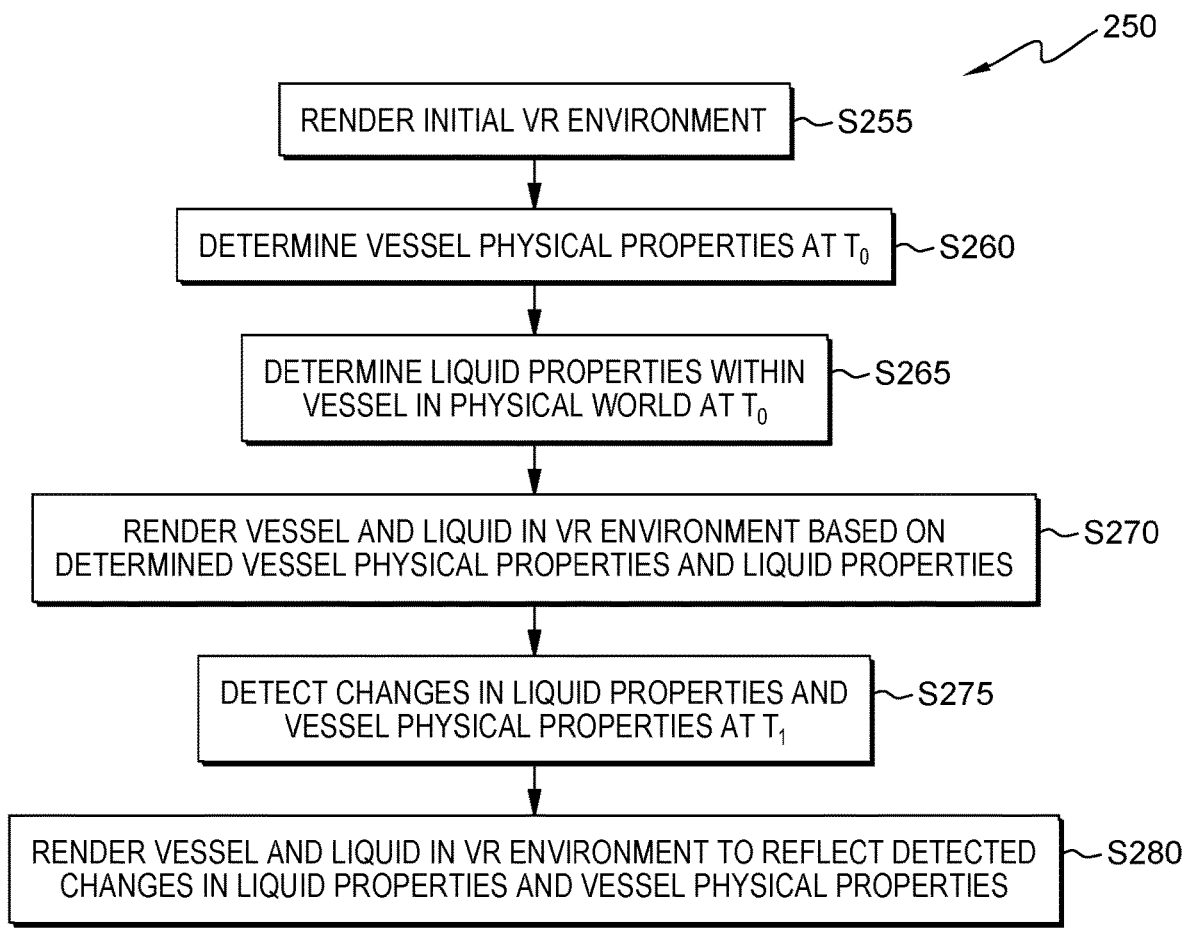
FIG. 2 is a flowchart showing a first embodiment method performed, at least in part, by the first embodiment system.
Figure 3:
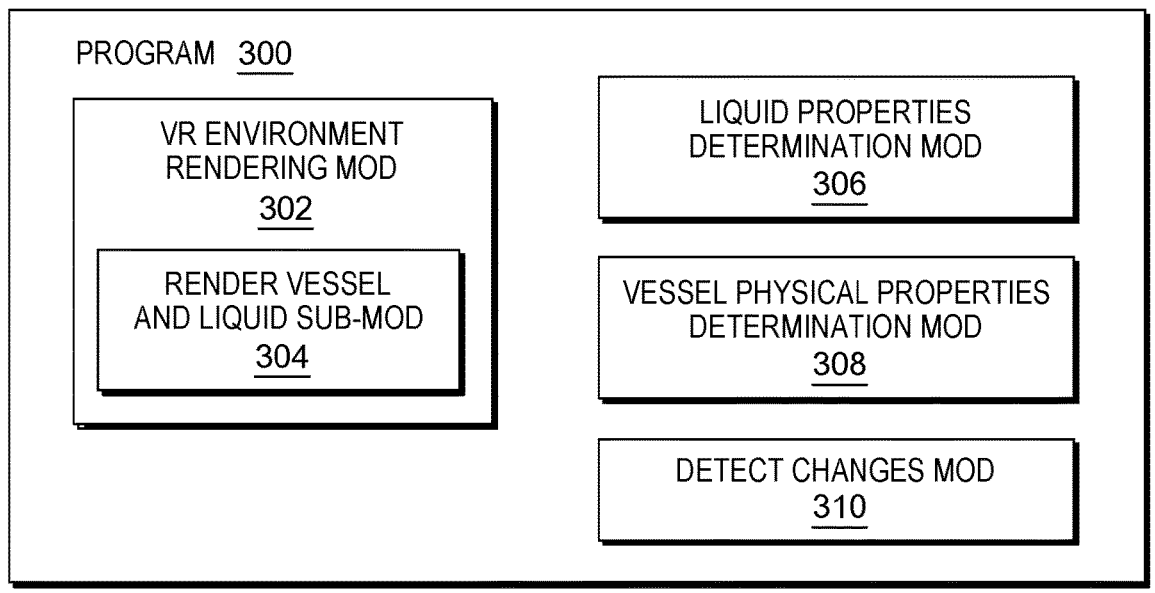
FIG. 3 is a block diagram showing a machine logic (for example, software) portion of the first embodiment system.

FIG. 2 shows flowchart 250 depicting a method according to the present invention. FIG. 3 shows program 300 performing at least some of the method operations of flowchart 250. This method and associated software will now be discussed, over the course of the following paragraphs, with extensive reference to FIG. 2 (for the method operation blocks), FIG. 3 (for the software blocks), and FIGS. 4A through 4H (for descriptive screenshots).

Processing begins at operation S255, where VR environment rendering module ("mod") 302 renders the initial VR environment through VR simulation sub-system 102 of FIG. 1 via networked computers system 100 and outputted through on VR interface device 110. In this simplified embodiment, networked computers system 100 is sometimes referred to as a Networked Virtual Reality Environment ("N.V.R.E.") and consists of a VR simulation sub-system 102 which contains a VR simulation computer 200 tasked with rendering a VR environment and processing interactions with the VR environment through N.V.R.E. The initial VR environment, rendered by VR environment rendering mod 302 of FIG. 3, is a social setting where one or more users are drinking from a physical liquid vessel rendered in the VR environment. Alternatively, the initial VR environment rendered may be any environment that can be created, designed, and/or imagined by a computer program and/or computer hardware capable of being rendered in a VR environment. For example, the initial VR environment rendered may be a simulated surgery operation for medical students to practice standard medical operation procedures. As a further alternative embodiment, the initial VR environment may be rendered in a remote location by a $3^{rd}$ party and/or $3^{rd}$ party hardware. For example, the initial VR environment rendered for a user may be rendered by a computer, and/or network of computer systems, that are remotely controlled by a $3^{rd}$ party who has granted access to the user to render the VR environment using the 3rd party equipment. As another example, the computer rendering the VR environment may be located at a separate (and potentially distant) geographic location, communicating the rendered VR environment to an end-user's VR headset via a computer network.

Processing proceeds to operation S260, where vessel physical properties determination mod 308 determines vessel physical properties at $T_0$ through N.V.R.E. of FIG. 1 through vessel physical property sensors 112. In this simplified embodiment, the physical properties of the vessel (sometimes herein referred to as a "container") in the physical world being determined at $T_0$ by vessel physical properties determination mod 308 of FIG. 3 is exemplified by mug 402A of screenshot 400A of FIG. 4A (third-person perspective) and exemplified by mug 402E of screenshot 400E of FIG. 4E (first-person perspective). Screenshot 400A of FIG. 4A and screenshot 400E of FIG. 4E (sometimes herein referred to as "screenshots 400A/400E") represent the physical world (at $T_0$) from a third-person perspective and first-person perspective respectively. As such, mug 402A of screenshot 400A of FIG. 4A and mug 402E of screenshot 400E of FIG. 4E (sometimes herein referred to as "mug 402A/E of screenshots 400A/400E") represent the same physical vessel (i.e., mug) in the physical world (at $T_0$) from a third-person perspective and first-person perspective respectively. The determined physical properties of mug 402A/E of screenshots 400A/400E (at $T_0$) include the inner dimensions of mug 402A/E of screenshots 400A/400E to calculate the maximum volume of liquid (sometimes herein referred to as "$V_{max}$") that mug 402A/E of screenshots 400A/400E can contain at $T_0$. The properties of mug 402A/E of screenshots 400A/400E (at $T_0$) are determined through vessel physical property sensors 112 of FIG. 1. In this simplified embodiment, vessel physical property sensors 112 consists of one or more cameras connected to N.V.R.E. to determine the $V_{max}$ (at $T_0$) of mug 402A/E of screenshots 400A/400E of FIG. 4A/E. The $V_{max}$ that mug 402A/E of screenshots 400A/400E may contain at $T_0$ is 1000 mL or one-liter (i.e., $V_{max}$=1 L at $T_0$). Alternatively, vessel physical properties determination mod 308 of FIG. 3 may determine additional dimensions of the physical vessel, including any handles, lids, straws, openings or spouts. For example, the determined physical properties of a coffee mug (at $T_0$) may include the dimensions of the mug handle and its lid. As a further alternative embodiment, vessel physical property sensors 112 of FIG. 1 may use one or more ultrasonic mapping (i.e., sonar) sensors to determine one or more physical properties of a physical vessel. For example, a N.V.R.E. may determine the maximum volume of a physical vessel through vessel physical property sensors 112 through two ultrasonic mapping sensors.

As a further alternative embodiment, vessel physical properties determination mod 308 may determine additional characteristics of a vessel, including color, pattern, and/or opacity. For example, the determined physical properties of a glass of grape juice (at $T_0$) may include purple with an opacity of 50%. As yet a further alternative embodiment, the determined physical properties of a vessel may include all physical properties that exist on a given vessel. For example, the determined physical properties of a water bottle may include the outer dimensions, inner dimensions (e.g., $V_{max}$), presence of a lid, degree of opacity, and solid red diamond pattern, which comprise all the water bottle's observable physical properties. As yet a further alternative embodiment, the determined physical properties of a vessel may be a combination of physical properties determined by a computer program. For example, a vessel's physical properties (at $T_0$) may include a $V_{max}$ equal to 1 L, a blue hexagon pattern, and a spherical shape, but a computer program selectively identifies the $V_{max}$ and spherical shape property, ignoring the blue hexagon pattern property for the purpose of vessel physical properties determination mod 308. As a further alternative embodiment, the physical vessel (the properties of which are to be determined at $T_0$ by vessel physical properties determination mod 308) may include any vessel capable of holding liquid, the present invention is not limited to vessels typically used for drinking, including vessels used for scientific purposes, vessels used to contain solids, vessels used to contain gases, and vessels used to contain plasma. For example, a VR environment may include a medical operation simulation that determines the physical properties of a syringe in the physical world (at $T_0$) to be rendered into the VR environment, as detailed below.

As a further alternative embodiment, the determined physical properties may include a physical vessel's location and/or orientation (at $T_0$) in the physical world. For example, vessel physical sensors 112 of FIG. 1 may determine that a mug in the physical world (at $T_0$) is six-feet above the floor and oriented at 90°. As yet a further alternative embodiment, vessel physical properties determination mod 308 of FIG. 3 may use various hardware components to determine the physical properties of a liquid vessel, including one or more infrared cameras to detect the temperature of a vessel within the physical world (at $T_0$) and reflect that temperature property in a rendered VR environment, as detailed below. For example, a physical liquid vessel may be 90° F. (at $T_0$) determined through one or more infrared cameras through vessel physical properties determination mod 308 and the temperature property may be reflected in a VR environment by rendering a virtual liquid vessel as "crimson red" and emitting steam.

Processing proceeds to operation S265, where liquid properties determination mod 306 determines the properties of a physical volumetric substance within a container in the physical world at $T_0$ through liquid property sensors 108 of FIG. 1 through the N.V.R.E. In this simplified embodiment, a physical volumetric substance (sometimes herein referred to as "liquid") is a liquid. The liquid properties to be determined (at $T_0$) by liquid properties determination mod 306 of FIG. 3, is exemplified by liquid 404A of screenshot 400A of FIG. 4A (third-person perspective) and exemplified by liquid 404E of screenshot 400E of FIG. 4E (first-person perspective). As such, liquid 404A of screenshot 400A of FIG. 4A and liquid 404E of screenshot 400E of FIG. 4E (sometimes herein referred to as "liquid 404A/E of screenshots 400A/400E") represent the same liquid (e.g., water)

within mug 402 A/E in the physical world (at $T_0$) from a third-person perspective and first-person perspective respectively. In this simplified embodiment, the liquid properties to be determined (at $T_0$), by liquid properties determination mod 306 of FIG. 3, is the current volume of liquid, contained within mug 402A/E of screenshots 400A/400E of FIG. 4A/E at $T_0$, which is equal to a volume of 750 mL. The volume of liquid at $T_0$ (sometimes herein referred to as "$V_0$") is exemplified by liquid 404A/E of screenshots 400A/400E, where $V_0$=750 mL. The properties of liquid 404A/E of screenshots 400A/400E (i.e., $V_0$=750 mL) are determined through liquid property sensors 108 of FIG. 1. In this simplified embodiment, liquid property sensors 108 consists of one or more cameras connected to N.V.R.E. to determine $V_0$.

Alternatively, liquid properties determination mod 306 of FIG. 3 may identify the type of liquid within a physical liquid vessel (at $T_0$) based on observable liquid properties, including the volume, color, opacity, temperature, density and/or carbonation. For example, a mug that contains 1 L of a cold, dark, syrupy liquid may be identified as soda based on its color, volume, opacity, and visible carbonation activity. As a further alternative embodiment, liquid properties determination mod 306 may determine all observable liquid properties, including volume, color, consistency, opacity, viscosity, and/or carbonation. For example, liquid properties determination mod 306 may identify all observable properties of liquid within a physical liquid vessel, such as: (a) $V_{max}$ equals 2 L, (b) $V_0$ equals 1 L, (c) purple, and (d) opacity value equals 70%. As a further alternative embodiment, the liquid properties to be determined may be a combination of specific, observable properties as specified by a computer program. For example, a liquid may have observable properties of color, volume, and opacity, liquid properties determination mod 306 specifically identifies the volume and opacity, and ignores the color property of the liquid, as specified by a computer program. As a further alternative embodiment, a user may input a specific type of liquid a physical liquid vessel contains, and liquid properties determination mod 306 is only tasked with determining the liquid properties unknown to the user at $T_0$. For example, a user selects grape juice and liquid properties determination mod 306 only determines the volume of grape juice (at $T_0$) within the grape juice vessel.

As a further alternative embodiment, liquid properties determination mod 306 of FIG. 3 may identify the type of liquid within a physical liquid vessel (at $T_0$) based on image recognition of writing and/or product wrappers on the vessel. For example, a liquid within plastic bottle could be identified as orange soda based on the text of the bottle label that has "Orange Soda" written on it. As a further alternative embodiment, liquid properties determination mod 306 of FIG. 3 may identify liquid properties of a liquid within a physical liquid vessel (at $T_0$) based on image recognition of writing and/or product wrappers on the vessel. For example, the liquid properties of grape juice within a physical liquid vessel may be determined by reading the barcode of the physical liquid vessel's label and finding the liquid properties of grape juice on the interne.

As a further alternative embodiment, a user may input a specific type of liquid within a physical liquid vessel, and one or more liquid properties are programmatically derived from the user input. For example, a user inputs "orange juice" and liquid properties determination mod 306 determines the $V_0$ of orange juice through liquid property sensors 108 of FIG. 1, and all other liquid properties of orange juice (e.g., color, opacity, viscosity, etc.) are calculated from the user input rather than liquid property sensors 108. As a further alternative embodiment, any liquid, or combination of liquids, found in the physical world may be used, the present invention is not limited to liquid typically used for drinking. For example, a VR environment may simulate a medical operation, and the liquid properties of a chemical compound may be determined and subsequently rendered into a VR environment, as detailed below. As a further alternative embodiment, liquid properties determination mod 306 of FIG. 3 may use one or more hardware components to measure the volume (and other physical properties) of liquid (or other types of substances contained within vessels, such as granular substances), such as: (a) magneto strictive level transmitters, (b) ultrasonic level transmitters, (c) radar level transmitters, (d) laser level transmitters, (e) magnetic float level sensors, and/or (f) mechanical float level sensors. For example, the N.V.R.E. determines the current volume of liquid in a physical liquid vessel through liquid properties determination mod 306 which utilizes a Bluetooth™ enabled ultrasonic level transmitter.

As a further alternative embodiment, a "physical volumetric substance" may include substances, such as: (a) liquid, (b) granular substances, (c) gas, (d) vapor, and/or (e) plasma. For example, liquid properties determination mod 306 may determine the chunk size property of a physical volumetric substance within a container that is determined to be the granular substance salt. A chunk size defines the approximate volume of a given piece (or grain) of a granular substance. For example, typical table salt might have a chunk (or grain) size of approximately 0.3 mm$^3$ or one third of a cubic millimeter.

Processing proceeds to operation S270 of FIG. 2, where render vessel and liquid sub-mod 304 renders a virtual representation of the physical volumetric substance and container, based on data from vessel physical properties determination mod 308 of FIG. 3 and liquid properties determination mod 306, into a VR environment through VR simulation sub-system 102 of FIG. 1 to VR interface device 110 of the N.V.R.E. In this simplified embodiment, data at a point in time ($T_a$) from vessel physical properties determination mod 308 of FIG. 3 and/or liquid properties determination mod 306 are sometimes herein referred to as a "snapshot". VR simulation computer 200 receives data about the determined vessel physical properties (i.e., $V_{max}$ at $T_0$) of mug 402A/E of screenshots 400A/400E of FIG. 4A/E through vessel physical properties determination mod 308 of FIG. 3 through vessel physical property sensor 112 of FIG. 1 through N.V.R.E. VR simulation computer 200 receives data about the determined vessel physical properties in the form of 3D coordinates in the physical world. The data sent to VR simulation computer 200 determines the maximum volume (at $T_0$) to be 1 L (i.e., $V_{max}$=1 L at $T_0$) and provides physical 3D coordinates (x, y, z) to be rendered into a VR environment through render vessel and liquid sub-mod 304 of FIG. 3. The render vessel and liquid sub-mod 304 renders the virtual 3D coordinates in a VR environment at a 1:1 ratio with respect to the physical 3D coordinates sent to VR simulation computer 200 of FIG. 1 (at $T_0$). VR simulation computer 200 receives data about the determined liquid properties (i.e., $V_0$) of liquid 404A/E of screenshots 400A/400E of FIG. 4A/E through liquid properties determination mod 306 of FIG. 3 through liquid property sensors 108 of FIG. 1 through N.V.R.E. VR simulation computer 200 receives data that indicates the current volume of liquid (at $T_0$) is 750 mL (i.e., $V_0$=750 mL). The render vessel and liquid sub-mod 304 of FIG. 3 may determine how "full" the vessel with the calculation $V_0/V_{max}$. The render vessel and liquid sub-mod 304 may use the physical 3D coordinates of mug 402A/E of screenshots 400A/400E of FIG. 4A/E to render a volume of liquid within the virtual vessel based on the physical 3D coordinates and how "full" the vessel is determined to be. In this simplified embodiment, the physical liquid vessel is 75% full (i.e., 750 mL/1 L=0.75) and the virtual representation of the physical volumetric substance will fill 75% of the virtual vessel. The data sent to VR simulation computer 200 reflects a snapshot of the determined physical properties of both mug 402A/E of screenshots 400A/400E of FIG. 4A/E and liquid 404A/E of screenshots 400A/400E in the physical world at $T_0$ (sometimes herein referred to collectively as "vessel/liquid physical properties (at $T_0$)"). The purpose of transmitting vessel/liquid physical properties (at $T_0$) data is to render the snapshot of determined physical properties within a VR environment (at $T_0$). In this simplified embodiment, the VR environment and vessel/liquid physical properties (at $T_0$) are processed/rendered by VR simulation computer 200 of FIG. 1. The VR simulation computer 200 displays a VR environment containing a virtual vessel and liquid, based on the determined vessel/liquid physical properties (at $T_0$), through a VR interface device 110 as exemplified by screenshot 400B of FIG. 4B (third-person perspective) and screenshot 400F of FIG. 4F (first-person perspective). Screenshot 400B of FIG. 4B and screenshot 400F of FIG. 4F (sometimes herein referred to as "screenshots 400B/400F") represent the rendered VR environment displayed to a user (at $T_0$) from a third-person perspective and first-person perspective respectively.

Figure 4A:
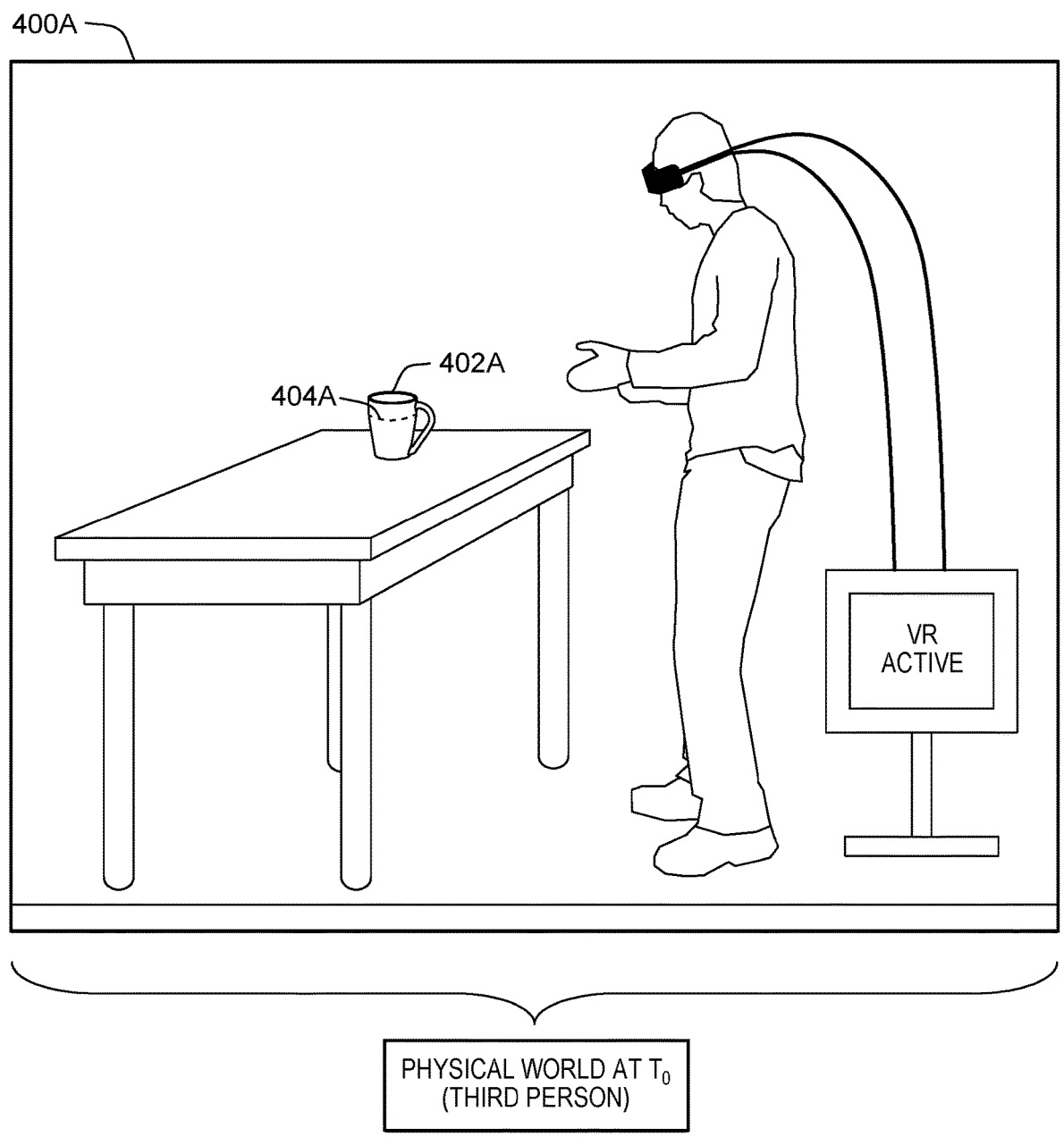
FIG. 4A through 4H are screenshots over a time period of $T_0$ to $T_1$, from both a first-person and third-person perspective, showing a physical and corresponding virtual reality scene helpful in understanding the first embodiment system.
Figure 4B:
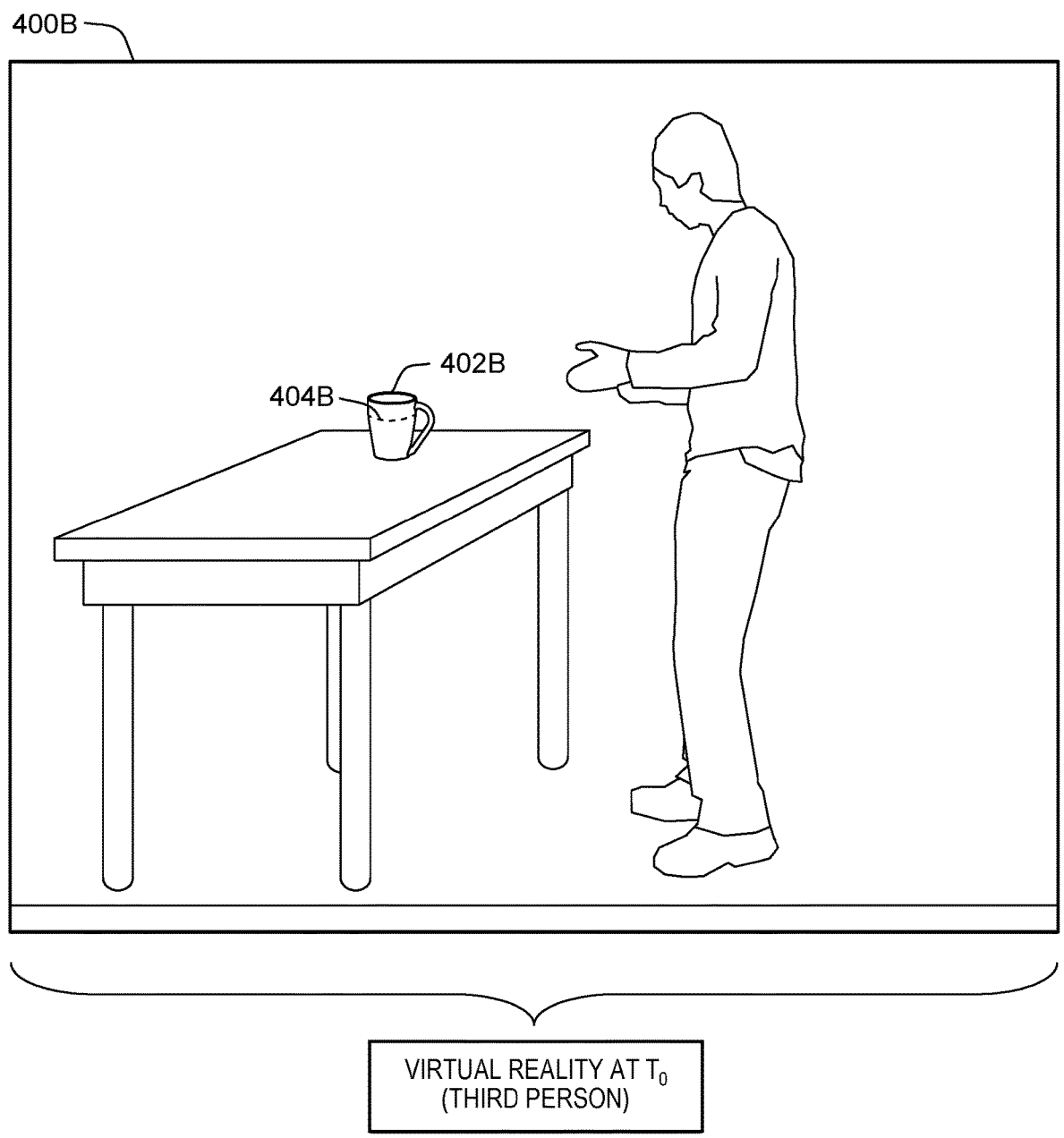

The rendered VR environment (FIG. 4B/F) reflects the determined vessel/liquid physical properties (at $T_0$) in the physical world (FIG. 4A/E). As such, mug 402B of screenshot 400B of FIG. 4B and mug 402F of screenshot 400F of FIG. 4F (sometimes herein referred to as "mug 402B/F of screenshots 400B/400F") is a VR environment rendered version (at $T_0$) of mug 402A/E of screenshots 400A/400E of FIG. 4A/E in the physical world (at $T_0$) from a third-person perspective and first-person perspective respectively. The liquid 404B of screenshot 400B of FIG. 4B and liquid 404F of screenshot 400F of FIG. 4F (sometimes herein referred to as "liquid 404B/F of screenshots 400B/400F") is a VR environment rendered version (at $T_0$) of liquid 404A/E of screenshots 400A/400E of FIG. 4A/E in the physical world (at $T_0$) from a third-person perspective and first-person perspective respectively. In this simplified embodiment, the determined vessel physical properties of mug 402A/E of screenshots 400A/400E of FIG. 4A/E in the physical world (i.e., $V_{max}$=1 L at $T_0$) are proportionately reflected, at a 1:1 ratio, within a VR environment (at $T_0$) as virtual mug 402B/F of screenshots 400B/400F of FIG. 4B/F. The determined properties of liquid 404A/E of screenshots 400A/400E of FIG. 4A/E in the physical world (i.e., $V_0$=750 mL) are proportionately reflected, at a 1:1 ratio, in a VR environment (at $T_0$) as virtual liquid 404B/F of screenshots 400B/400F of FIG. 4B/F. Alternatively, render vessel and liquid sub-mod 304 of FIG. 3 is processed by one or more additional computers, and/or networked computer systems, tasked with rendering a physical vessel and any liquid it contains (at $T_0$) to be utilized by VR simulation sub-system 102 of FIG. 1. For example, a networked computers system may contain two VR simulation sub-systems (e.g., VR simulation sub-system A and B), VR simulation sub-system A may be responsible for running program 300, and VR simulation sub-system B may be tasked with rendering the physical vessel and any liquid into a virtual version to be utilized by VR simulation sub-system A.

As a further alternative embodiment, the virtual representation of a physical volumetric substance and its vessel may have manipulated properties with respect to the determined vessel/liquid physical properties (at $T_0$) in the physical world. For example, the determined vessel/liquid physical properties (at $T_0$) in the physical world may include a red cup containing a white liquid, whereas the virtual vessel/liquid rendered within a VR environment (at $T_0$) may be a gold cup containing a glowing, blue liquid. As a further alternative embodiment, a VR environment, and VR objects within the environment, may be rendered to complement the location and/or orientation of the vessel and liquid in the physical world (at $T_0$). For example, it may be determined that a cup in the physical world (at $T_0$) is on the center of a table, six-feet off the ground, at a 90° angle, and a computer may render a VR environment (at $T_0$) with a virtual vessel/liquid on the center of a table, six-feet off the ground, at a 90° angle. Alternatively, the properties of the virtual representation of a vessel and/or physical volumetric substance within the vessel may be rendered differently based upon the determined physical characteristics of each. For example, the vessel may be rendered in the VR environment with variable proportions corresponding to the physical characteristics of the vessel, such as a 2:1 ratio, or N:N'. As yet a further alternative, additional properties of the physical liquid vessel and/or physical volumetric substance within the vessel may be tracked and rendered within the VR environment. For example, if one or more sensors determine a temperature for the physical volumetric substance within the vessel (such as 150° F., 150° C., 150 Kelvin, or a descriptive temperature such as Cold, Warm, Hot, Very Hot, Scalding, etc.), the physical volumetric substance within the vessel may be rendered in the VR environment with a color corresponding to the temperature and/or steam evaporating off of the virtual representation of the physical volumetric substance if it is above a temperature threshold. Alternatively, a numerical temperature overlay may be rendered onto the virtual representation of a physical volumetric substance vessel in the VR environment to indicate the present temperature of the physical volumetric substance within the vessel in the physical world. For example, a physical volumetric substance within a container may have a determined temperate of 100° F., and render vessel and liquid sub-mod 304 renders a virtual representation of the physical volumetric substance container with a numerical display that says "Caution: 100° F.".

Processing proceeds to operation S275 of FIG. 2, where detect changes mod 310 detects changes in liquid properties at $T_1$ through liquid property sensors 108 of FIG. 1 and detects changes in vessel physical properties at $T_1$ through vessel physical property sensors 112, with respect to determined vessel/liquid physical properties (at $T_0$). In this simplified embodiment, screenshot 400C of FIG. 4C and screenshot 400G of FIG. 4G (sometimes herein referred to as "screenshots 400C/400G of FIG. 4C/G") represent the physical world (at $T_1$) from a third-person perspective and first-person perspective respectively. Any detected changes to vessel physical properties and/or liquid properties (at $T_1$) may be determined by detect changes mod 310 of FIG. 3. As such, mug 402C of screenshot 400C of FIG. 4C and mug 402G of screenshot 400G of FIG. 4G (sometimes herein referred to as "mug 402C/G of screenshots 400C/400G") represent the same physical vessel (i.e., mug) in the physical world (at $T_1$) from a third-person perspective and first-person perspective respectively. Liquid 404C of screenshot 400C of FIG. 4C and liquid 404G of screenshot 400G of FIG. 4G (sometimes herein referred to as "liquid 404C/G of screenshots 400C/400G") represent the same liquid (e.g., water) within mug 402C/G of screenshots 400C/400G in the physical world (at $T_1$) from a third-person perspective and first-person perspective respectively.

Figure 4C:
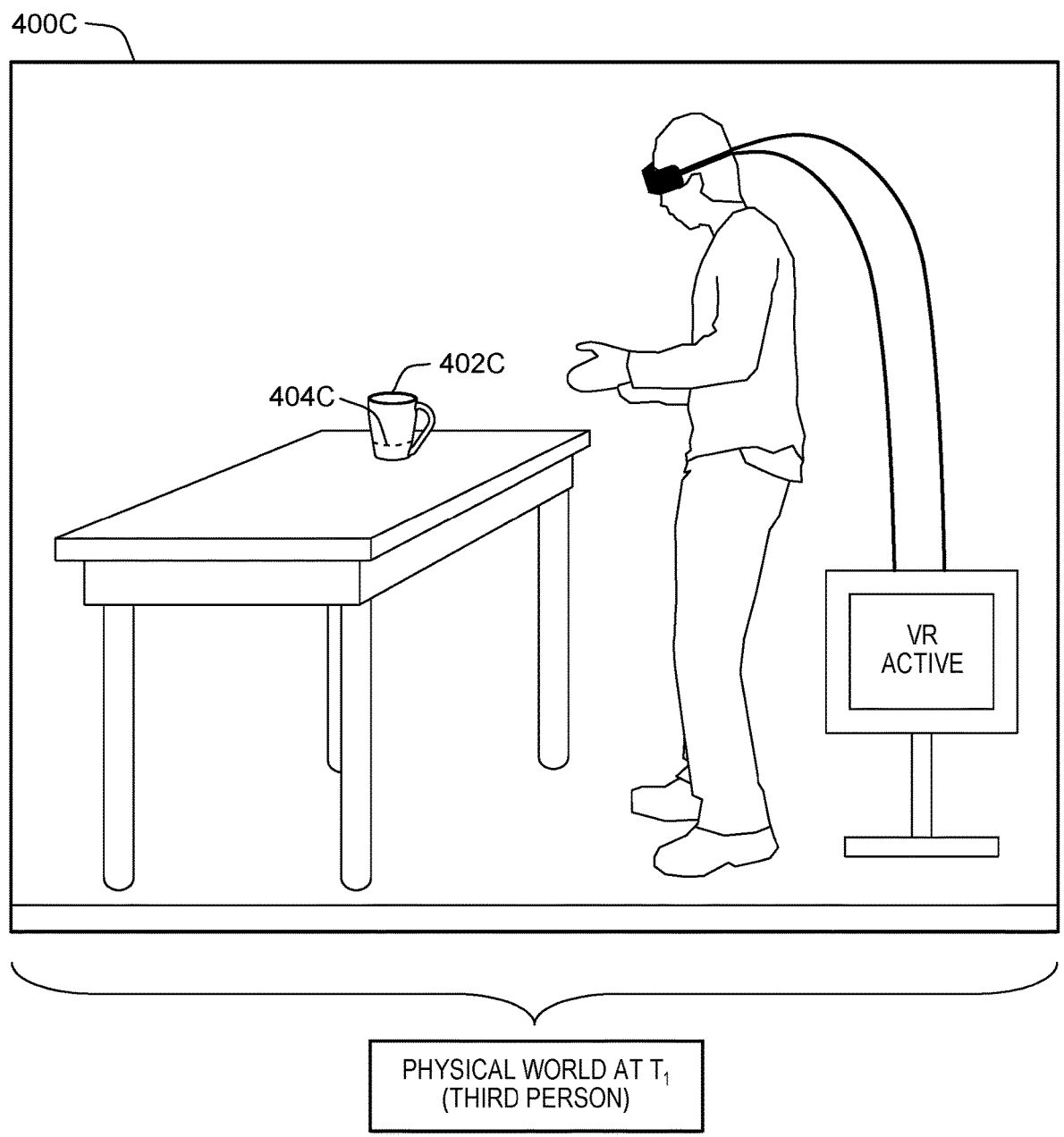

In this simplified embodiment, N.V.R.E. of FIG. 1 detects any change to the snapshot of determined physical properties of mug 402C/G of screenshots 400C/400G of FIG. 4C/G (at $T_1$) through detect changes mod 310 of FIG. 3 through vessel physical property sensors 112 of FIG. 1, with respect to the snapshot of determined vessel physical properties (at $T_0$) of mug 402A/E of screenshots 400A/400E of FIG. 4A/E. N.V.R.E. of FIG. 1 detects any change to the snapshot of determined liquid properties of liquid 404C/G of screenshots 400C/400G of FIG. 4C/G (at $T_1$) through detect changes mod 310 of FIG. 3 through liquid property sensors 108 of FIG. 1, with respect to the snapshot of determined liquid properties (at $T_0$) of liquid 404A/E of screenshots 400A/400E of FIG. 4 A/E. In this simplified embodiment, the determined physical properties of mug 402C/G of screenshots 400C/400G of FIG. 4C/G are held constant over the time interval $T_0$ to $T_1$ (i.e., $V_{max}$ at $T_0$ is equal to $V_{max}$ at $T_1$). The determined current volume of liquid 404C/G of screenshots 400C/400G at $T_1$ (sometimes herein after referred to as "$V_1$") is equal to 375 mL (i.e., $V_1$=375 mL). The volume of liquid 404C/G of screenshots 400C/400G (at $T_1$) has decreased by 50% with respect to volume of liquid 404 A/E (at $T_0$). The determined physical properties at $T_1$, $V_{max}$ and $V_1$ (sometimes herein referred to as "vessel/liquid physical properties (at $T_1$)"), are determined through detect changes mod 310 of FIG. 3 through vessel physical property sensors 112 of FIG. 1 and through liquid property sensors 108. The determined vessel/liquid physical properties (at $T_1$) are sent to VR simulation computer 200 through VR simulation sub-system 102.

Alternatively, one or more determined physical properties of a liquid vessel (at $T_1$) may not have been detected, present and/or determined (at $T_0$), and reflect additional properties to be detected and rendered into a VR environment (at $T_1$). For example, a glass may be rendered without a straw (at $T_0$), and a straw is subsequently put into the glass (at $T_1$), detect changes mod 310 of FIG. 3 detects the straw and proceeds to render the additional physical property (i.e., a straw) into the VR environment (at $T_1$) through operation S280, as detailed below. As a further alternative embodiment, one or more determined liquid properties (at $T_1$) may not have been detected, present, and/or determined (at $T_0$), and reflect additional properties to be detected and rendered into a VR environment (at $T_1$). For example, a glass of water (with all observable liquid properties) may be rendered (at $T_0$), and cooking oil may be subsequently placed into the glass (at $T_1$), detect changes mod 310 may detect the presence of the additional liquid (i.e., cooking oil) at $T_1$ and proceed to render the additional liquid properties (i.e., all observable liquid properties of cooking oil and water at $T_1$) into the VR environment (at $T_1$) through operation S280, as detailed below. As a further alternative embodiment, detect changes mod 310 may detect changes to VR environment settings at $T_1$ with respect to VR environment settings at $T_0$, including the scenery, location, time of day, and/or VR objects. For example, a VR environment may be in an urban scenery (at $T_0$) and detect changes mod 310 may detect a change in the VR environment to a rural, country-side scenery (at $T_1$).

Figure 4D:
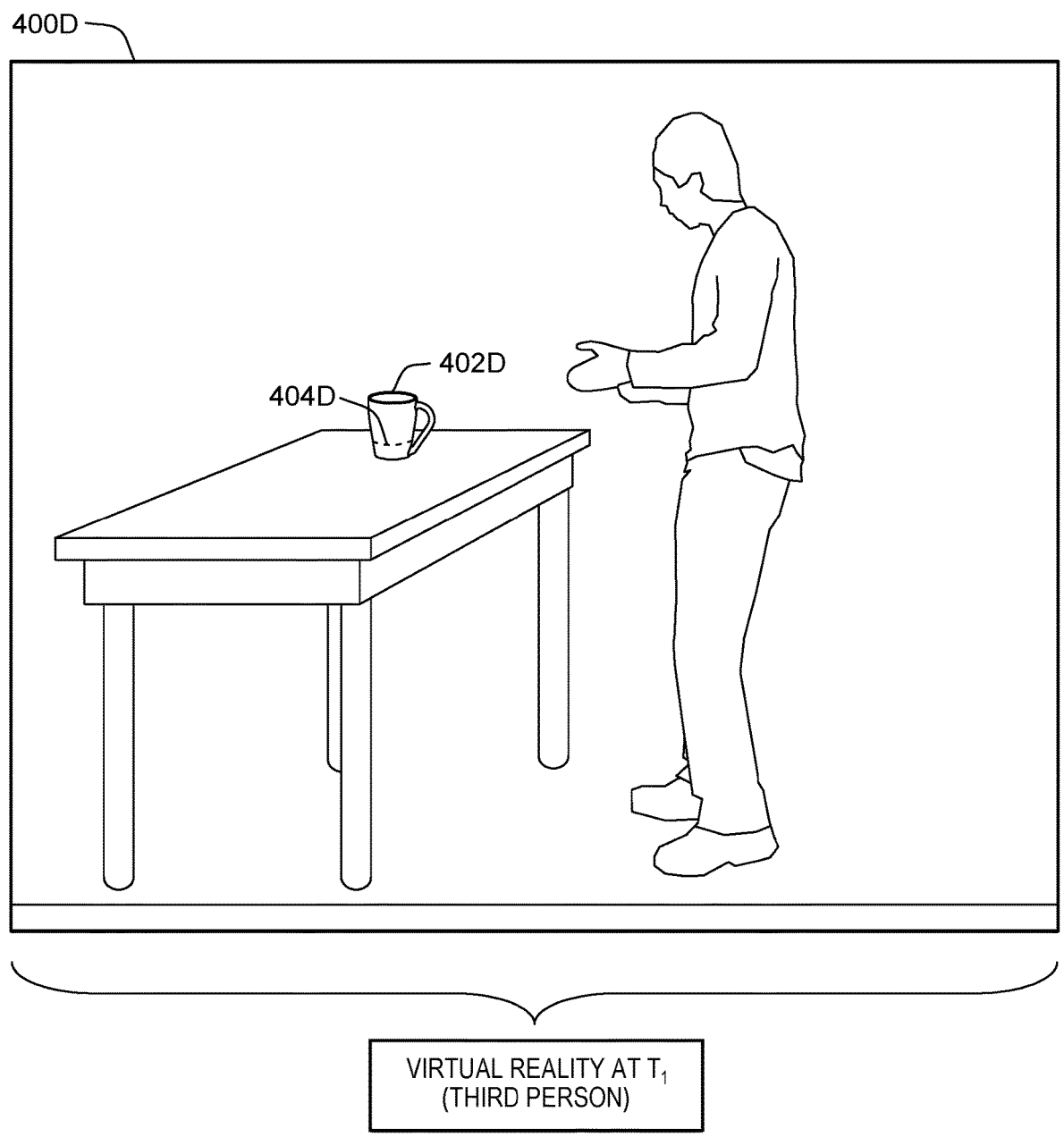
Figure 4E:
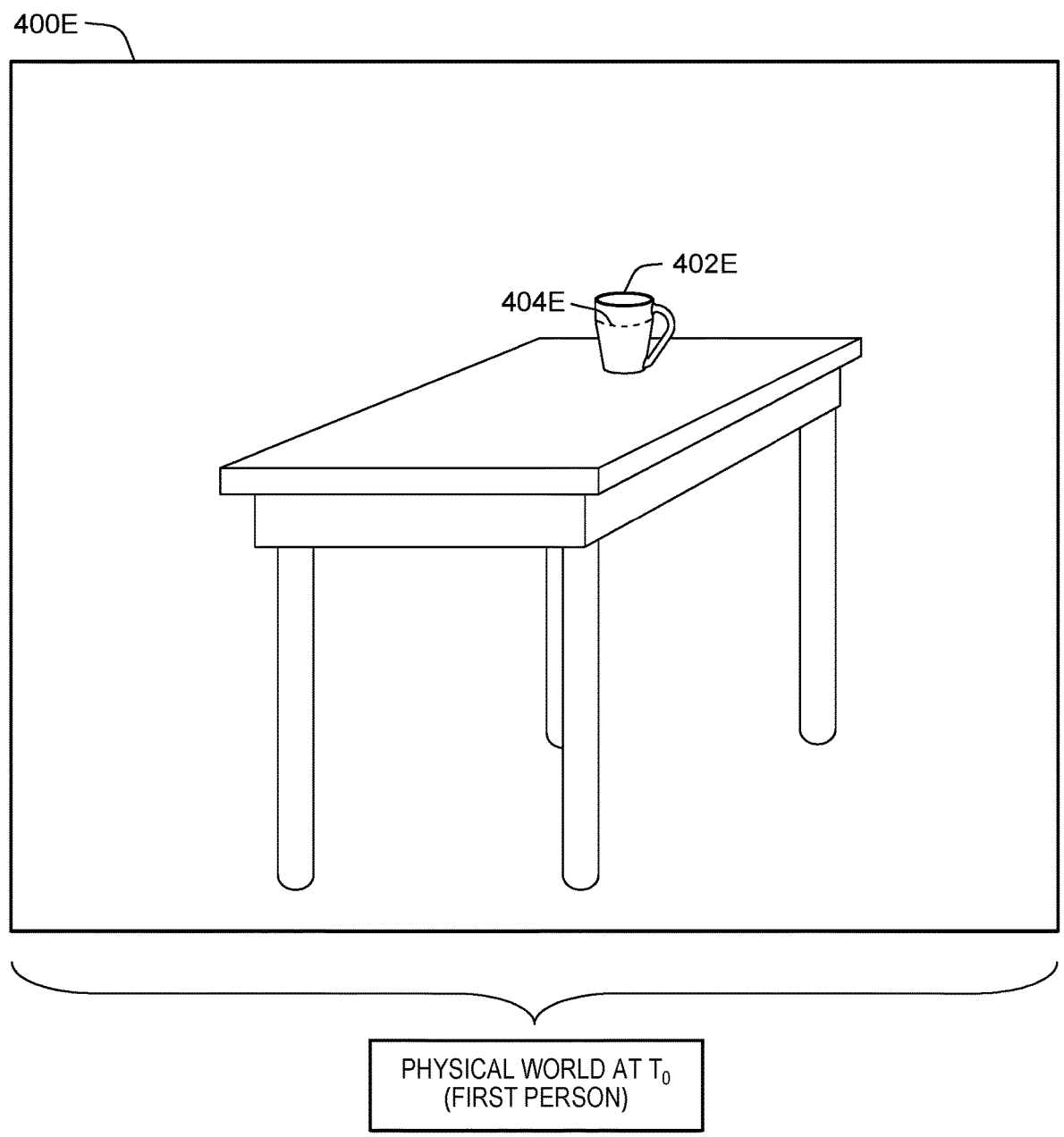
Figure 4F:
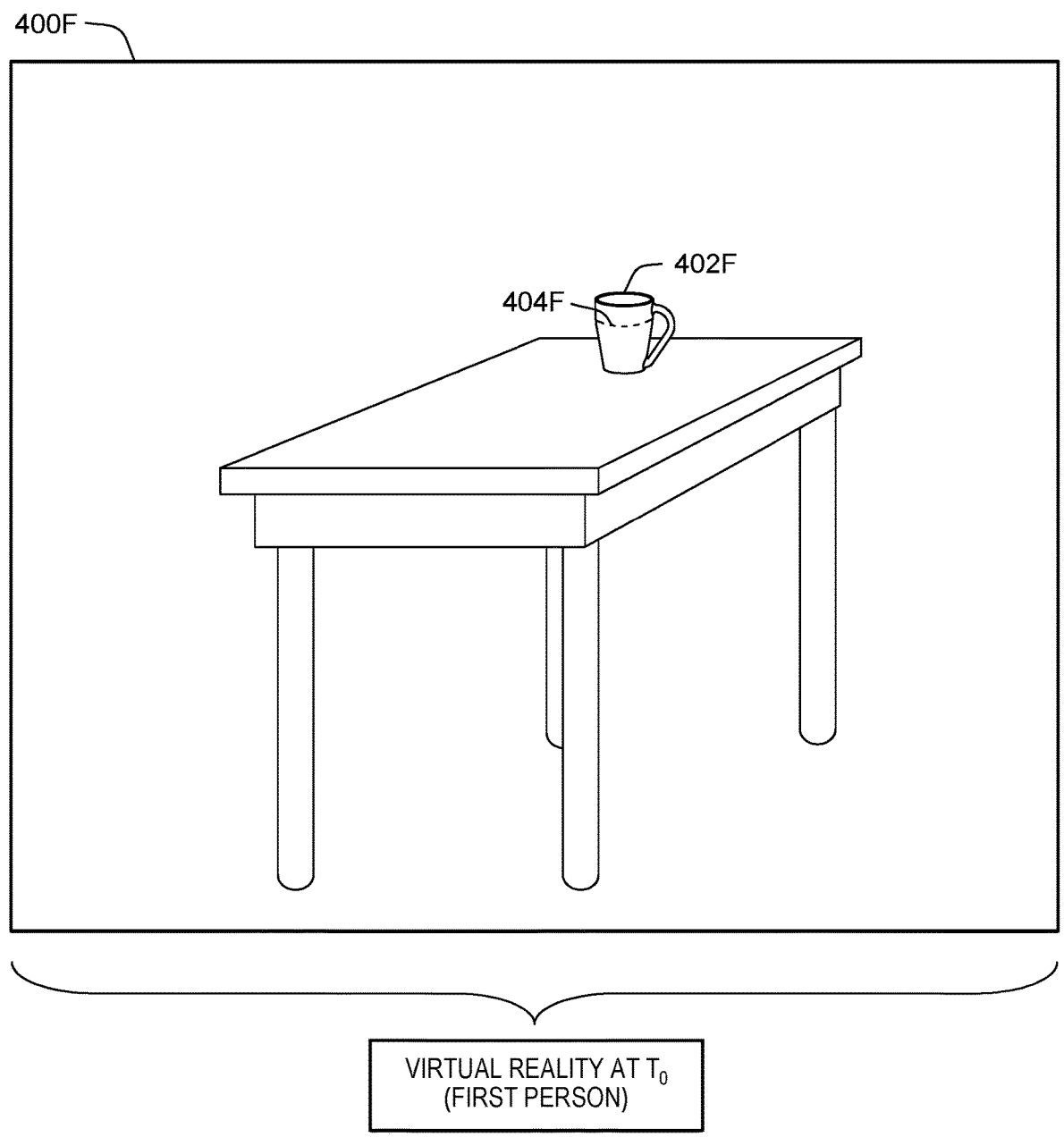
Figure 4G:
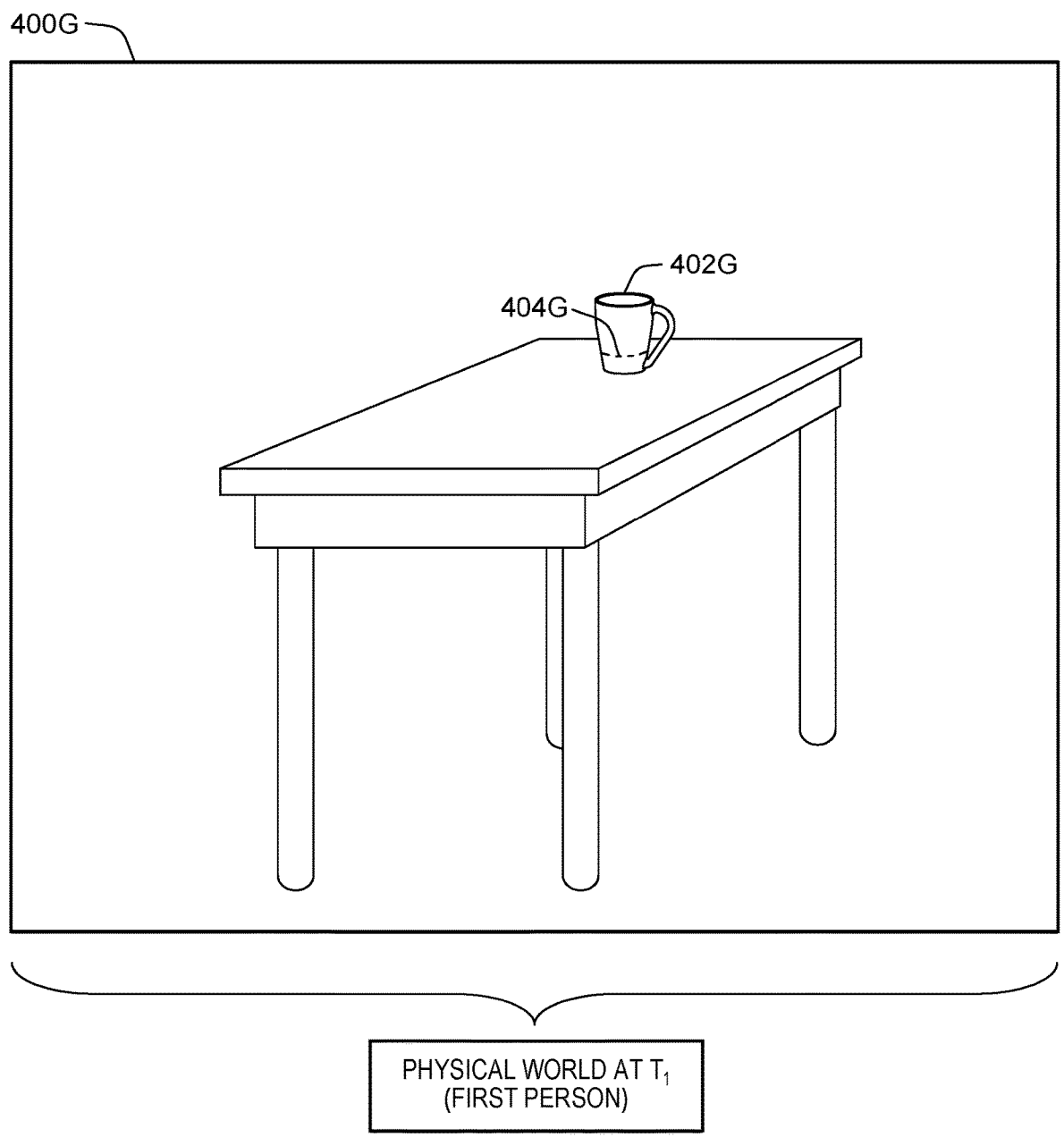
Figure 4H:
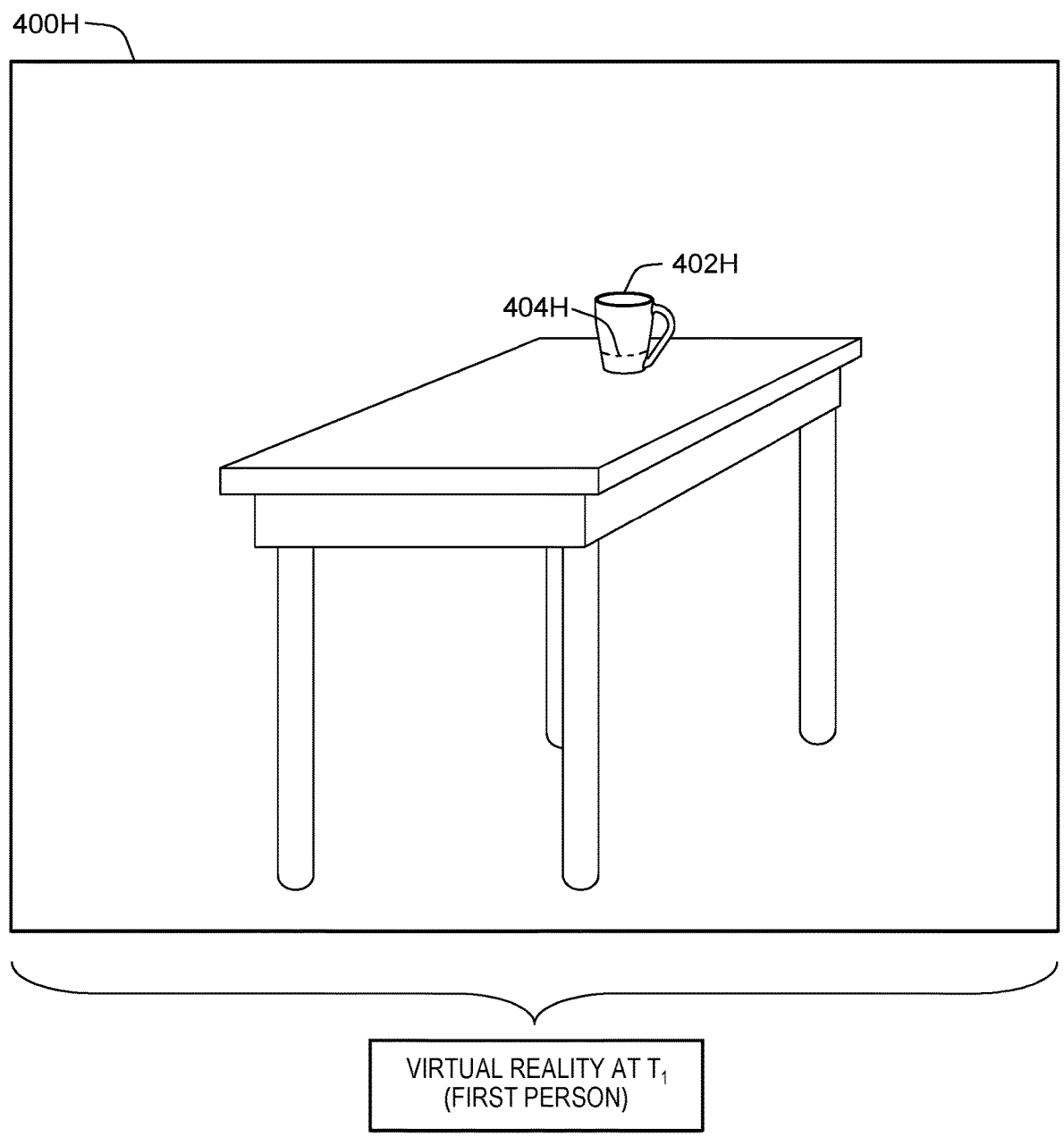

Processing proceeds to operation S280, where render vessel and liquid sub-mod 304 renders the determined vessel physical properties (at $T_1$) through detect changes mod 310 through vessel physical property sensors 112 of FIG. 1 and renders the determined liquid properties (at $T_1$) through detect changes mod 310 of FIG. 3 through liquid property sensors 108 of FIG. 1 into a VR environment through VR simulation sub-system 102 through VR interface device 110. In this simplified embodiment, any changes detected (at $T_1$) by detect changes mod 310 of FIG. 3 may be subsequently rendered in VR simulation computer 200 of FIG. 1 through VR simulation sub-system 102 and displayed through a VR interface device 110 as exemplified by FIG. 4D of FIG. 4 (third-person perspective) and FIG. 4H (first-person perspective). FIG. 4D and FIG. 4H (sometimes herein referred to as "FIG. 4D/H") represent a rendered VR environment (at $T_1$) displayed to a user through VR interface device 110 of FIG. 1, from a third-person perspective and first-person perspective respectively. The rendered VR environment (FIG. 4D/H) reflects the determined vessel/liquid physical properties (at $T_1$) in the physical world (FIG. 4C/G). As such, mug 402D of screenshot 400D of FIG. 4D and mug 402H of screenshot 400H of FIG. 4H (sometimes herein referred to as "mug 402D/H of screenshots 400D/400H") is a VR environment rendered virtual version (at $T_1$) of mug 402C/G of screenshots 400C/400G of FIG. 4C/G in the physical world (at $T_1$) from a third-person perspective and first-person perspective respectively. The determined vessel physical properties of mug 402C/G of screenshots 400C/400G (i.e., $V_{max}$ at $T_1$) are proportionally reflected, at a 1:1 ratio, in the rendered VR environment (at $T_1$) as mug 402D/H of screenshots 400D/400H of FIG. 4D/H. Liquid 404D of screenshot 400D of FIG. 4D and liquid 404H of screenshot 400H of FIG. 4H (sometimes herein referred to as "liquid 404D/H of screenshots 400D/400H") is a VR environment rendered virtual version (at $T_1$) of liquid 404C/G of screenshots 400C/400G of FIG. 4C/G in the physical world (at $T_1$) from a third-person perspective and first-person perspective respectively. The determined liquid properties of liquid 404C/G of screenshots 400C/400G (i.e., $V_1$) are proportionally reflected, at a 1:1 ratio, in the rendered VR environment (at $T_1$) as liquid 404D/H of screenshots 400D/400H of FIG. 4D/H. The rendered VR environment (FIG. 4D/H) enables a user to interact with virtual mug 402D/H of screenshots 400D/400H (at $T_1$) through VR interface device 110 of FIG. 1 and, thus, simultaneously interact with mug 402C/G of screenshots 400C/400G of FIG. 4C/G in the physical world (at $T_1$). The rendered VR environment (FIG. 4D/H) enables a user to interact with liquid 404D/H of screenshots 400D/400H (at $T_1$) through VR interface device 110 of FIG. 1 and, thus, simultaneously interact with liquid 404C/G of screenshots 400C/400G of FIG. 4C/G in the physical world (at $T_1$).

Alternatively, render vessel and liquid sub-mod 304 of FIG. 3 is processed by one or more additional computers, and/or networked computer systems, tasked with rendering a physical vessel and/or liquid (at $T_1$) to be utilized by VR simulation sub-system 102 of FIG. 1. For example, a networked computers system may consist of two VR simulation sub-systems (e.g., VR simulation sub-system A and B), VR simulation sub-system A may be responsible for running program 300, and VR simulation sub-system B may be tasked with rendering a virtual version of a physical vessel, and any liquid it contains, to be utilized by VR simulation sub-system A (at $T_1$). As a further alternative embodiment, the VR environment settings may have changed at $T_1$ with respect to the VR environment settings at $T_0$, as such, the rendered virtual vessel/liquid properties are changed (at $T_1$) to reflect the change in the VR environment settings, where the physical vessel/liquid properties may remain constant from $T_0$ to $T_1$. For example, a rendered VR environment (at $T_0$) may be a social night-life scene in Manhattan, the VR environment settings may have changed (at $T_1$) to a beach in Miami while the vessel/liquid physical properties remain constant from $T_0$ to $T_1$, and the rendered virtual vessel/liquid reflect the VR environment change (at $T_1$). As a further alternative embodiment, both the VR environment settings (at $T_1$) and the determined vessel/liquid physical properties (at $T_1$) in the physical world may have changed with respect to the settings and determined vessel/liquid properties (at $T_0$). For example, a full glass of soda may be rendered (at $T_0$) at a social venue in London, detect changes mod 310 of FIG. 3 may determine the glass of soda is half full (at $T_1$), and the VR environment settings changed (at $T_1$) to a social venue in Madrid. The detected changes to the determined vessel/liquid physical properties (at $T_1$) and VR environment settings (at $T_1$) may be rendered to reflect all detected changes and displayed to a user through a VR interface device.

Figure 5:
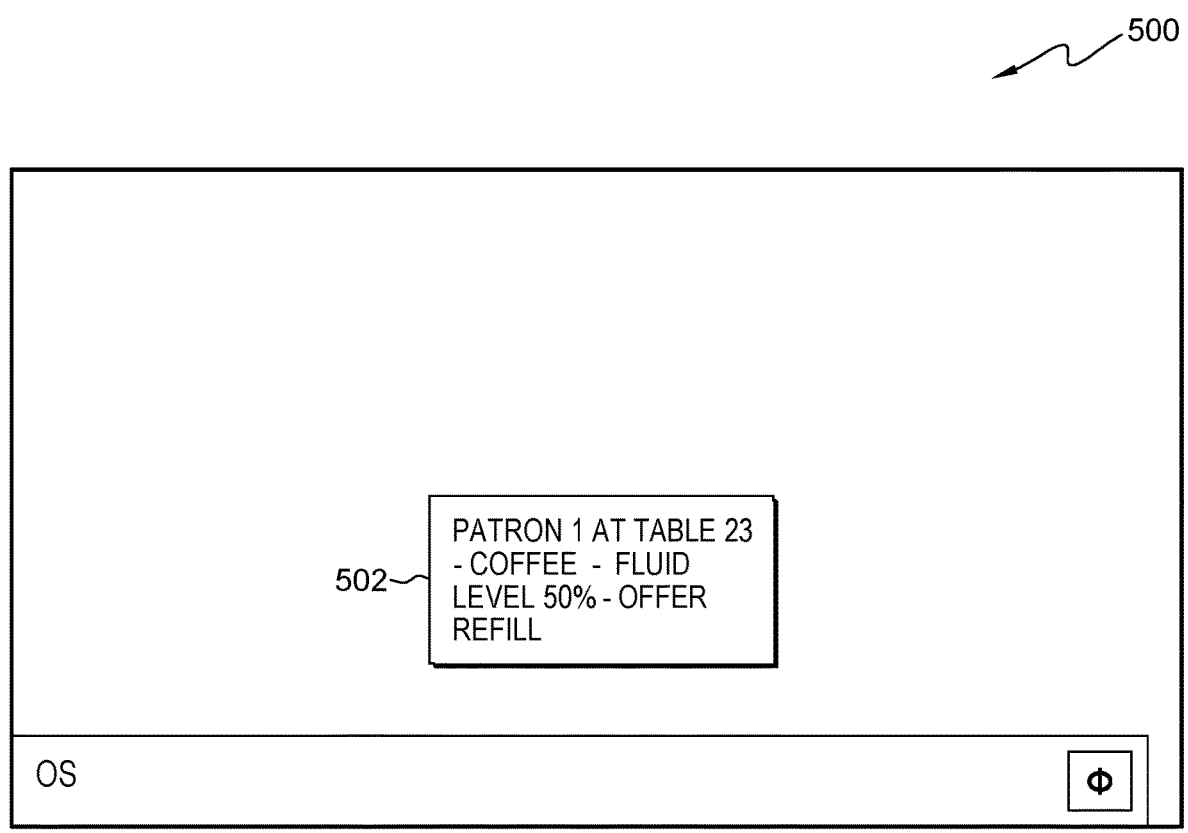
FIG. 5 is a screenshot view generated by the first embodiment system.

As a further alternative embodiment, a determined $V_1$ value (i.e., current liquid volume at $T_1$) may be reported to client 104 of FIG. 1 in real-time. For example, client 104 may be a café computer that receives real-time data about the current volume of liquid within a user's physical liquid vessel. Detect changes mod 310 of FIG. 3 determines a user's $V_1$ vessel value to be 50% of the $V_{max}$. A notification 502 of screenshot 500 of FIG. 5 is sent to client 104 of FIG. 1 that includes the $V_1$, $V_{max}$, identifies the type of liquid, identifies the user, identifies the user location, and provides a suggested action (e.g., "Patron 1 at Table 23—Coffee—Fluid Level 50%—Offer Refill"). As a further alternative embodiment, all determined vessel/liquid physical properties of one or more users may be reported to client 104. For example, client 104 may be a café computer that receives all determined vessel/liquid physical properties data in the physical world over a time period $T_0$ to $T_n$, where $T_0$ is a user's initial connection to client 104 and $T_n$ is a future point in time when a user disconnects from client 104.

As a further alternative embodiment, one or more determined physical properties of a physical volumetric substance of one, or more, users may be transmitted to one or more peripheral computer components. For example, a notification is sent to a communication-enabled mug when the determined temperature of the liquid within falls below a threshold.

III. Further Comments and/or Embodiments

Some embodiments of the present invention recognize the following facts, potential problems and/or potential areas for improvement with respect to the current state of the art: (i) a virtual-reality (VR) environment where there may be a need to project real-time, real-life liquid containers into the VR environment, such as: (a) a social scene over drinks, and/or (b) a medical procedure; (ii) enable users to meet inside a VR environment remotely to share an experience, such as: (a) sharing a meal, (b) conducting a meeting, (c) exploring a new location, (d) conducting a therapy session, and/or (e) observing a medical procedure; and (iii) the VR environment and/or scenario may be changed to match the target experience, such as: (a) exploring the pyramids, (b) fine dining in France, (c) experiencing history in a historical castle, (d) replaying an event, and/or (e) aged care.

Some embodiments of the present invention may include one, or more, of the following features, characteristics and/or advantages: (i) may be used in a VR shared dining experience; (ii) enable beverages and/or drinking as part of the physical world and VR environment; (iii) rendering of the liquid vessel used by each person so that the VR vessels accurately reflect vessel characteristics, such as: (a) type, (b) shape, (c) color, and (d) volume of liquid; (iv) applied to various liquid vessels, such as: (a) bottles, (b) coffee mug, (c) measuring cup, and (d) lemonade pitcher etc.; (v) a realistic atmosphere which is conducive for enhanced social interaction; (vi) physical placement of the liquid vessel on a table so that the user may determine how to pick up the vessel in the VR world; (vii) monitoring the volume of liquid being consumed (For example, volume of liquid consumed in a medical environment); (viii) monitoring the volume of liquid output (For example, monitoring volume of liquid output by medical patients); (ix) integration into VR based medical procedures; (x) enable simultaneous interaction with a liquid, and its vessel, in a VR and real-world environment; and (xi) relatively inexpensive to implement in an existing VR environment.

Some embodiments of the present invention may include one, or more, of the following features, characteristics and/or advantages: (i) describing a physical liquid vessel's (e.g. bottle, glass, or cup) characteristics, such as: (a) dimensions, (b) shape, and/or (c) maximum volume; (ii) determining how full the vessel is through a temperature based sensor (For example, determining a "fullness" value based on the current volume of water in a liquid vessel and its known maximum volume value); (iii) determining how full a liquid vessel is through a float-based strip sensor; (iv) rendering a liquid vessel within a VR environment; (v) allow fluid-based objects and/or containers from the physical world to be accurately rendered in the VR environment with numerous applications; and (vi) a VR system with one or more components, such as: (a) VR headset worn by the user, (b) VR sensors in one or more corners of the room that are used to locate VR objects within that space, and/or (c) VR software/system for processing.

Some embodiments of the present invention may include one, or more, of the following features, characteristics and/or advantages: (i) two, or more, strip sensors able to detect fluid level through a temperature differential; (ii) VR tags may allow vessel position to be known to the VR environment and/or sensors; (iii) two, or more, strip sensors applied on opposite sides of a liquid vessel to describe vessel characteristics, such as: (a) vessel position, (b) vessel orientation, (c) liquid temperature, and/or (d) liquid volume; (iv) a liquid vessel, such as: (a) glass, (b) cup, and/or (c) bottle; (v) 3-D scanner may determine the physical dimensions and/or shape of a liquid vessel; (vi) VR sensors and/or scanners for locating the VR tags; (vii) the VR system may be pre-loaded with a pre-determined set of standard liquid vessels, with known characteristics, such as: (a) size, (b) shape, (c) color, and/or (d) appearance; (viii) if a liquid vessel is used which is not known by the system, then the vessel should be sufficiently uniform in shape such that a 3-D scanner can measure vessel dimensions; (ix) sensors able to detect the fluid level within a vessel; (x) strip sensors on a vessel that communicate, through wireless electronic communication (for example, Bluetooth™), about vessel properties, such as: (a) the vessel's physical position, (b) the vessel's physical orientation, and/or (c) the fluid level within the vessel; and (xi) sensors visible to a VR system that can then accurately locate them within the environment.

Some embodiments of the present invention may include one, or more, of the following features, characteristics and/or advantages: (i) upon order of a drink, the system may detect if the dimensions of the vessel are known by the system using existing technology (For example, RFID); (ii) a vessel of unknown dimensions may be analyzed by a 3-D scanner to have its dimensions uploaded to the VR system (For example, the dimensions of a user's mug are unknown to the system so the user analyzes the mug with a 3-D scanner to upload the mug dimensions to the VR system); (iii) strip sensors may be attached to the liquid vessel; (iv) VR sensors may pick up the 3-D positioning based on standard VR sensors; (v) the vessel, and the liquid it contains with its respective current volume value (e.g. the "fullness" of the vessel), may be rendered in the VR environment for both the drinker and, if any, other parties in the VR environment; (vi) automated notifications when the system detects the vessel as empty, or near empty; (vii) may enable a more realistic VR experience for the people in the VR environment by including actual beverages; (viii) allow the translation of a physical fluid level to a rendered VR fluid level; (ix) allow accurate rendering of any type of liquid characteristics, such as: (a) color, (b) shape, and/or (c) volume; and (x) user of the VR hardware may accurately locate the liquid vessel in the physical world, whilst immersed in the user's VR environment.

Some embodiments of the present invention may include one, or more, of the following features, characteristics and/or advantages: (i) enabling accurate food intake in virtual reality environment by tracking, positioning and/or rendering the food container; (ii) acquiring real-time position information of the food container which has true geometric shape; (iii) a VR shared dining experience; (iv) accurately render a drinking vessel and/or its contents inside a virtual-reality world in a manner that can enable the drinker to safely consume the beverage despite the VR hardware (e.g., headset) and experience.

Some embodiments of the present invention may include one, or more, of the following features, characteristics and/or advantages: (i) uplifting VR capability to enable beverages and/or drinking as part of the physical and VR world, with the rendering of the drinking vessel used by each person so that the virtual reality vessels accurately reflect the type, shape, color and/or amount of liquid in each vessel; (ii) create a more realistic atmosphere which is conducive for better social interaction; (iii) solution for the physical placement of the drinking vessel on the table so that the drinker can determine how to pick up the vessel in the VR world; (iv) monitoring the amount of liquid being consumed in a medical situation; (v) monitoring the amount of liquid output by patients, integrated into VR based medical procedures; (vi) allows a liquid and its container to be interacted with simultaneously in a VR and real world environment; (vii) not rely on video cameras; (viii) VR position trackers and/or fluid level sensors to accurately render fluid levels; (ix) rely on shape, height, levels etc.; (x) fluid level sensors combined with VR tracking components; (xi) VR enhanced containers, with accurate contents sensors; (xii) allow other users to see from their (i.e., the primary user who has the physical liquid vessel) perspective, as the actual shape, and/or structure, and/or contents data is known to the VR system; and (xiii) rendered in the VR based on any angle, and/or viewpoint, and/or perspective.

Figure 6:
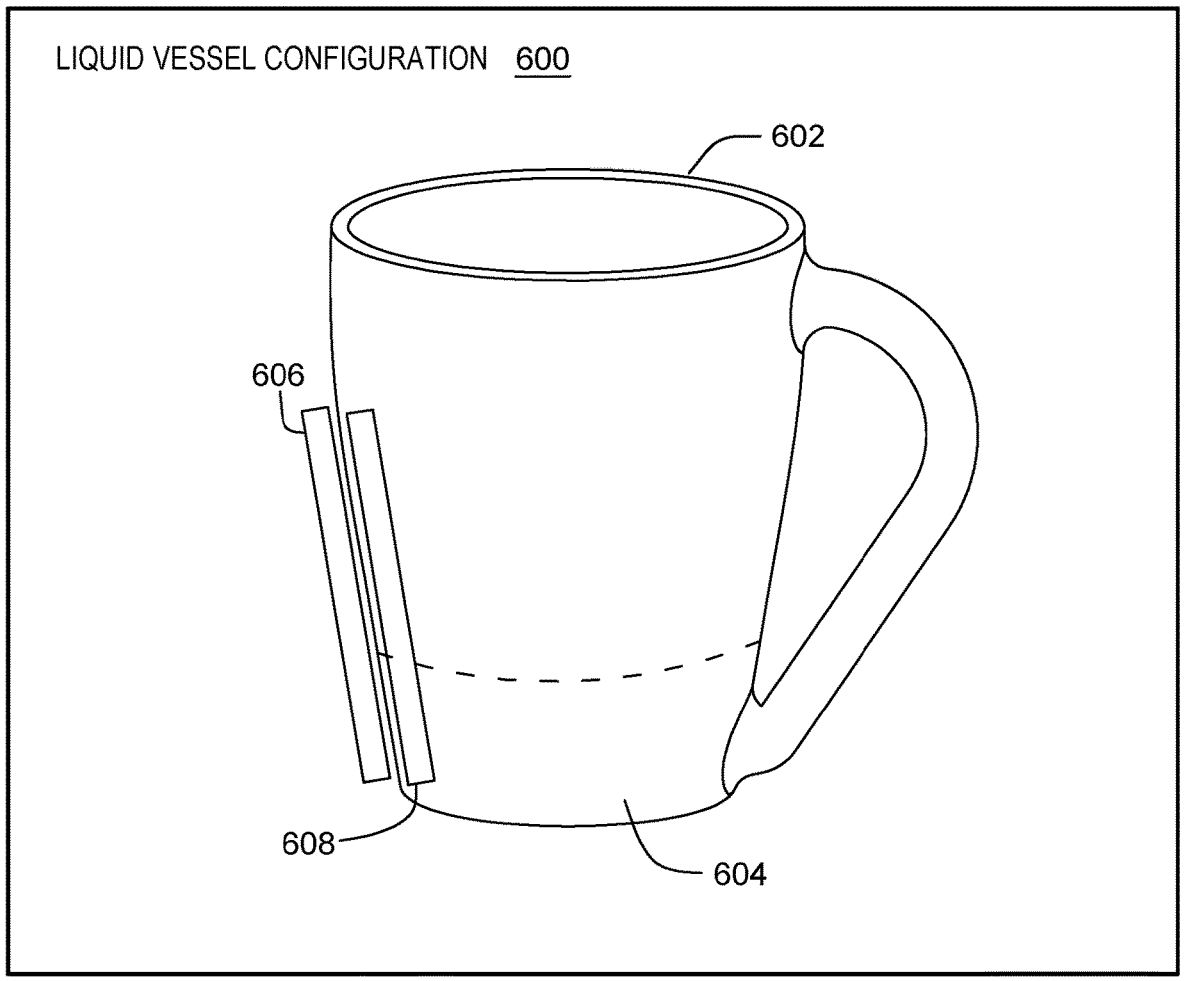
FIG. 6 is a block diagram view of a second embodiment of a system according to the present invention.

An embodiment of a possible hardware and software environment for software and/or methods according to the present invention will now be described in detail with reference to the Figures. FIG. 6 describes various portions of liquid vessel configuration 600, which is an example glass (i.e., liquid vessel) to be used in conjunction with a VR environment according to an embodiment of the present invention. Liquid vessel configuration 600, includes: (i) glass 602; (ii) glass 602 contains liquid 604; (iii) glass 602 is attached to outside strip sensor with VR tag 606; (iv) glass 602 is attached to inside strip sensor with VR tag 608; (v) outside strip sensor with VR tag 606 and inside strip sensor with VR tag 608 determine properties of liquid 604; and (vi) outside strip sensor with VR tag 606 and inside strip sensor with VR tag 608 transmit information about determined properties of liquid 604.

Figure 7:
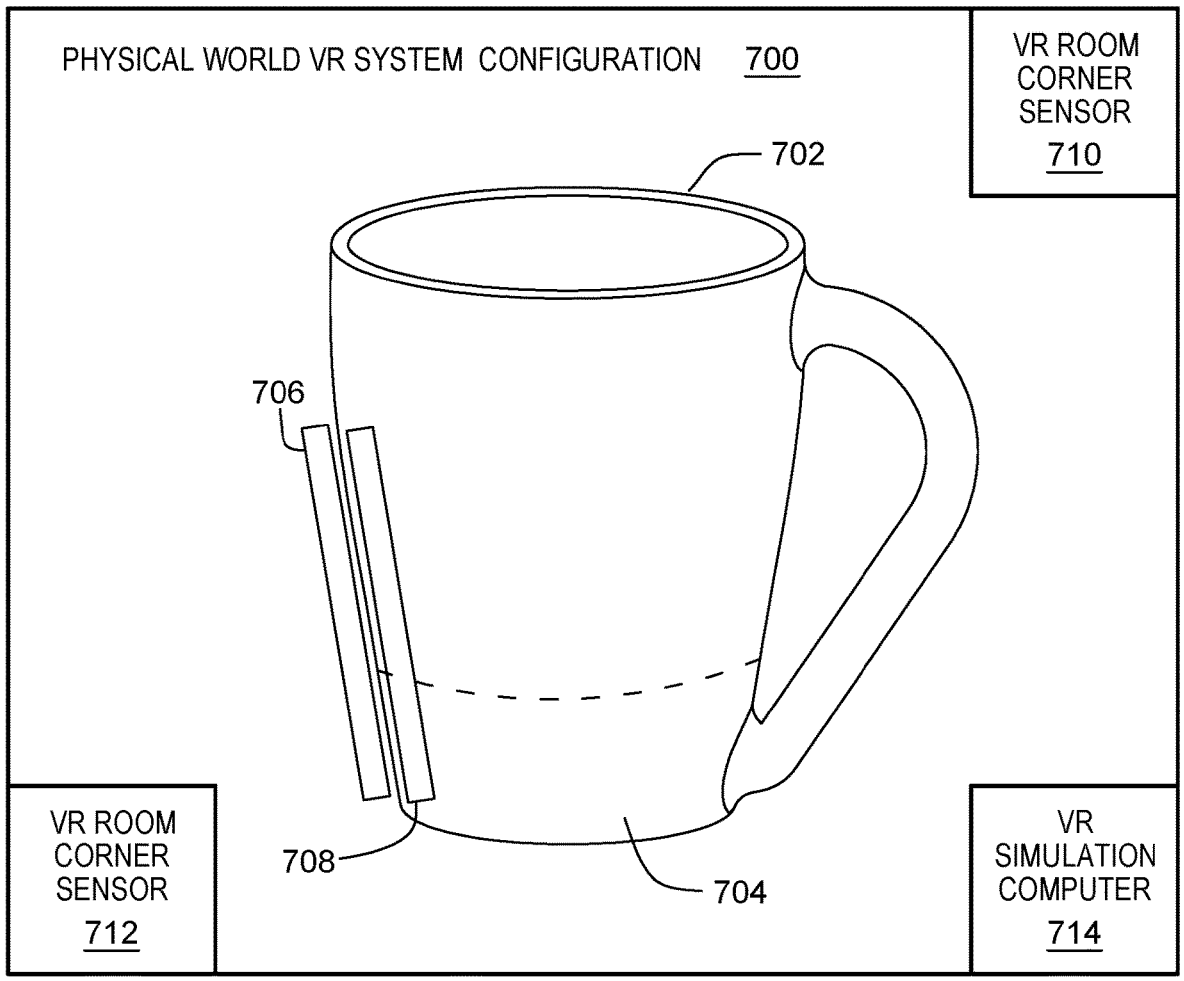
FIG. 7 is a block diagram view of a third embodiment of a system, according to the present invention.

An embodiment of a possible hardware and software environment for software and/or methods according to the present invention will now be described in detail with reference to the Figures. FIG. 7 describes various portions of physical world VR system configuration 700, which is an example configuration of hardware to render a liquid vessel within a VR environment according to an embodiment of the present invention. Physical world VR system configuration 700, includes: (i) glass 702; (ii) glass 702 contains liquid 704; (iii) glass 702 is attached to outside strip sensor with VR tag 706; (iv) glass 702 is attached to inside strip sensor with VR tag 708; (v) outside strip sensor with VR tag 706 and inside strip sensor with VR tag 708 determine properties of liquid 704; (vi) outside strip sensor with VR tag 706 and inside strip sensor with VR tag 708 determine properties of liquid 704 through Bluetooth to VR room corner sensors 710 and 712; (vii) VR room corner sensors 710 and 712 receive information about determined properties of liquid 704; and (viii) VR room corner sensors 710 and 712 transmit information about determined properties of liquid 704 through Bluetooth to VR simulation computer 714.

Glass 702 is a physical liquid vessel that contains a physical volumetric substance liquid 704. The physical liquid vessel, glass 702, is attached to two sensors: (a) outside strip sensor with VR tag 706, and (b) inside strip sensor with VR tag 708. The outside strip sensor with VR tag 706 and inside strip sensor with VR tag 708 (collectively, "strip sensors") are used to monitor and/or transmit data about glass 702 and liquid 704, such as: (a) glass 702 physical position, (b) glass 702 physical orientation, and/or (c) fluid level of liquid 704 within the glass 702. Typically, VR system sensors are in the corner of the room and are used to locate VR objects within that space. The strip sensors transmit data about glass 702 and liquid 704 through Bluetooth to VR room corner sensors 710 and 712. The data transmitted to VR room corner sensors 710 and 712 are sent to the VR software/system for processing. The data is processed and rendered to be displayed to a user. Typically, a VR headset is worn by the user and contains a display of the rendered VR environment. The rendered VR environment contains a virtual representation of the physical volumetric substance (i.e., liquid 704) within its container (i.e., glass 702) for the user to interact with.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
generating a virtual reality environment corresponding to a simulated environment surrounding a user wearing a virtual reality head mounted display based, at least in part, on real world physical surroundings of the user, where the physical real-world environment includes a physical volumetric substance within physical container and the simulated environment substitutes the physical real-world environment from visual perspective of the user when the user wears the virtual reality head mounted display;
determining a plurality of snapshots of at least one physical property of the physical volumetric substance within the container over a time interval;
rendering, in the virtual reality environment, a virtual volumetric substance in a virtual container, with relative position of the virtual container to the user wearing the virtual reality head mounted display corresponding to relative position of the physical container to the user in the physical real-world environment, where visual properties of the virtual volumetric substance correspond to the at least one physical property of the physical volumetric substance based, at least in part, on the plurality of snapshots, with changes to the at least one physical property of the physical volumetric substance evidenced in the plurality of snapshots resulting in corresponding changes to the visual properties of the virtual volumetric substance, where the relative position of the virtual container to the user wearing the virtual reality head mounted display changes responsive to movement of the physical container in the physical real-world while the visual properties of the virtual volumetric substance track the at least one physical property of the physical volumetric substance such that the user simultaneously interacts with the physical volumetric substance within the physical container in the physical real-world and the virtual volumetric substance within the virtual container in the virtual reality environment; and
transmitting an indicator data set indicative of one or more physical properties of the physical volumetric substance within the physical container to one or more external clients, where the indicator data set is based, at least in part, on the determined plurality of snapshots of at least one physical property of the physical volumetric substance.

2. The CIM of claim 1 wherein:
at least one physical property of the physical volumetric substance within the container over the time interval further includes at least one selection from the group consisting of: (a) a volume property, (b) a color property, (c) a degree of opacity, (d) a viscosity property, (e) a carbonation property, and (f) a grain size property of a granular substance.

3. The CIM of claim 1 wherein:
the physical volumetric substance within the container includes at least one selection from the group consisting of: (a) a liquid substance, (b) a gas substance, (c) a vapor substance, (d) a plasma substance, and (e) a granular substance.

4. The CIM of claim 1 wherein:
visual properties of the virtual container are based, at least in part, on virtual reality environmental settings corresponding to a selected type of simulated social environment for a virtual reality user to undertake virtual reality interactions within.

5. The CIM of claim 1 wherein:
the determined plurality of snapshots of at least one physical property of the physical volumetric substance within a container over the time interval is observed by one or more sensors selected from the group consisting of: (a) computer cameras, (b) external digital cameras, (c) one or more infrared cameras, (d) ultrasonic mapping sensors, and (e) float level sensors.

6. The CIM of claim 1 wherein rendering the virtual volumetric substance in the virtual reality environment further includes displaying, as an overlay over the virtual container, one or more user interface elements indicating one or more physical properties of the physical volumetric substance.

7. A computer program product (CPP) comprising:
a machine readable storage device; and
computer code stored on the machine readable storage device, with the computer code including instructions for causing a processor(s) set to perform operations including the following:
    generating a virtual reality environment corresponding to a simulated environment surrounding a user wearing a virtual reality head mounted display based, at least in part, on real world physical surroundings of the user, where the physical real-world environment includes a physical volumetric substance within physical container and the simulated environment substitutes the physical real-world environment from visual perspective of the user when the user wears the virtual reality head mounted display,
    determining a plurality of snapshots of at least one physical property of the physical volumetric substance within the container over a time interval,
    rendering, in the virtual reality environment, a virtual volumetric substance in a virtual container, with relative position of the virtual container to the user wearing the virtual reality head mounted display corresponding to relative position of the physical container to the user in the physical real-world environment, where visual properties of the virtual volumetric substance correspond to the at least one physical property of the physical volumetric substance based, at least in part, on the plurality of snapshots, with changes to the at least one physical property of the physical volumetric substance evidenced in the plurality of snapshots resulting in corresponding changes to the visual properties of the virtual volumetric substance, where the relative position of the virtual container to the user wearing the virtual reality head mounted display changes responsive to movement of the physical container in the physical real-world while the visual properties of the virtual volumetric substance track the at least one physical property of the physical volumetric substance such that the user simultaneously interacts with the physical volumetric substance within the physical container in the physical real-world and the virtual volumetric substance within the virtual container in the virtual reality environment; and
    transmitting an indicator data set indicative of one or more physical properties of the physical volumetric substance within the physical container to one or more external clients, where the indicator data set is based, at least in part, on the determined plurality of snapshots of at least one physical property of the physical volumetric substance.

8. The CPP of claim 7 wherein:
at least one physical property of the physical volumetric substance within the container over the time interval further includes at least one selection from the group consisting of: (a) a volume property, (b) a color property, (c) a degree of opacity, (d) a viscosity property, (e) a carbonation property, and (f) a grain size property of a granular substance.

9. The CPP of claim 7 wherein:
the physical volumetric substance within the container includes at least one selection from the group consisting of: (a) a liquid substance, (b) a gas substance, (c) a vapor substance, (d) a plasma substance, and (e) a granular substance.

10. The CPP of claim 7 wherein:
visual properties of the virtual container are based, at least in part, on virtual reality environmental settings corresponding to a selected type of simulated social environment for a virtual reality user to undertake virtual reality interactions within.

11. The CPP of claim 7 wherein:
the determined plurality of snapshots of at least one physical property of the physical volumetric substance within a container over the time interval is observed by one or more sensors selected from the group consisting of: (a) computer cameras, (b) external digital cameras, (c) one or more infrared cameras, (d) ultrasonic mapping sensors, and (e) float level sensors.

12. A computer-implemented method (CIM) for use with a virtual reality environment (VRE) and a material substance that is subject to changing its shape and volume over time, stored within a physical container, the material substance being characterizable by a set of volume parameter value(s) and a set of shape parameter value(s), the CIM comprising:
    intermittently generating, by one or more float level sensors, a series of size-and-shape data sets over a time interval during which the material substance changes its shape and volume over time, with each size-and-shape data set including: (i) a set of volume parameter value(s) indicative of the size of the material substance, and (ii) a set of shape parameter value(s) indicative of the shape of the material substance;
    responsive to the generation of each given size-and-shape data set of the series of size-and-shape data sets, generating a corresponding visual display data set that includes a visual rendering of the material substance within the VRE as a virtual material substance within a virtual container corresponding to a simulation of the physical container, with the visual appearance of the virtual material substance being based upon the set of size parameter(s) and the set of shape parameters of the given size-and-shape data set;

for each given visual display data set corresponding to a respective size-and-shape data set, generating a visual display in the VRE based on the visual display data set so that the changes in shape and volume over time of the material substance in the real world is tracked by properties of the visual appearance of virtual material substance in the VRE;

wherein visual appearance of the virtual container within the VRE is based, at least in part, on a set of VRE properties corresponding to a selected simulated social environment for a user wearing a virtual reality device to be immersed in; and transmitting an indicator data set indicative of one or more physical properties of the material substance within the physical container to one or more external clients, where the indicator data set is based, at least in part, on the series of size-and-shape data sets.

13. The CIM of claim 12 wherein:

the material substance is further characterizable by at least one of the following additional properties: (a) temperature, (b) color, (c) opacity, (d) viscosity, (e) a carbonation property, and (f) a grain size property of a granular substance;

the intermittently generated series of size-and-shape data sets further includes a set of parameter values corresponding to the at least one additional properties;

the set of parameter values is generated by one or more sensors selected from the group consisting of: (a) computer cameras, (b) external digital cameras, (c) one or more infrared cameras, (d) ultrasonic mapping sensors, and (e) float level sensors; and the visual appearance of the virtual material substance is further based upon the set of parameter values corresponding to the at least one additional properties.

14. The CIM of claim 12 wherein:

the material substance is at least one of: (a) a liquid substance, (b) a gas substance, (c) a vapor substance, (d) a plasma substance, and (e) a granular substance.

15. The CIM of claim 12, further comprising:

transmitting the visual display in the VRE to one or more virtual reality devices.

16. The CIM of claim 15, further comprising:

displaying the visual display in the VRE on the one or more virtual reality devices.

17. The CIM of claim 16, wherein the one or more virtual reality devices includes a virtual reality headset device worn by a first user.

* * * * *